(12) United States Patent
Huynh (10) Patent No.: US 6,981,409 B2
(45) Date of Patent: Jan. 3, 2006

(54) CONTROL SURFACE CONTROLLER FORCE MEASUREMENT SYSTEM

(75) Inventor: Neal V. Huynh, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 55 days.

(21) Appl. No.: 10/813,854

(22) Filed: Mar. 31, 2004

(65) Prior Publication Data
US 2005/0022590 A1    Feb. 3, 2005

Related U.S. Application Data

(60) Provisional application No. 60/509,060, filed on Aug. 1, 2003.

(51) Int. Cl.
*G01N 1/00* (2006.01)
(52) U.S. Cl. ............... 73/170.02; 73/802.05; 73/862.01; 244/224
(58) Field of Classification Search ............ 73/170.02, 73/862, 802, 862.01; 244/224, 215, 78
See application file for complete search history.

(56) References Cited

U.S. PATENT DOCUMENTS

| | | | | |
|---|---|---|---|---|
| 3,421,719 A | * | 1/1969 | Ask | 244/78 |
| 5,008,825 A | * | 4/1991 | Nadkarni et al. | 701/4 |
| 5,195,381 A | | 3/1993 | Keibler | |
| 5,388,788 A | * | 2/1995 | Rudolph | 244/215 |
| 2003/0183728 A1 | * | 10/2003 | Huynh | 244/224 |

OTHER PUBLICATIONS

National Physical Laboratory, "Types of Force Transducer", The Internet: http://www.npl.co.uk/force/faqs/transtypes.html. May 28, 2003.
National Physical Laboratory, "Types of Force Transducer", The Internet: http://www.npl.co.uk/force/faqs/transtypes/html. May 28, 2003.

* cited by examiner

*Primary Examiner*—Edward Lefkowitz
*Assistant Examiner*—Andre Allen
(74) *Attorney, Agent, or Firm*—Alston & Bird LLP (57) ABSTRACT

A control surface controller force measurement system for an aircraft is provided and includes a control surface interface for positioning the aerodynamic control surfaces on an aircraft. The control surface interface transfers mechanical force to an articulated crank, which supplies the flight control system with the desired position of the control surface. The articulated crank has a first mechanical link that is pivotable about a first pivot and a second mechanical link interconnecting the control surface interface to the first mechanical link. The second mechanical link is pivotable with respect to the control surface interface at a second pivot. A force transducer interconnects the first and second mechanical links independent of the second pivot such that the mechanical force applied to the control surface interface is represented by an electrical signal output of the force transducer.

23 Claims, 10 Drawing Sheets

CONTROL SURFACE CONTROLLER FORCE MEASUREMENT SYSTEM

CROSS-REFERENCE TO RELATED APPLICATIONS

This application claims the benefit of U.S. Provisional Application No. 60/509,060, convened front U.S. Nonprovisional applicatian Ser. No. 10/633,369, filed Aug. 1, 2003, which is hereby incorporated herein in its entirety by reference.

FIELD OF THE INVENTION

The present invention relates to control surface controllers for aircraft, and more particularly, to control surface controller force measurement systems that measure control surface interface force input for aircraft control surface controllers.

BACKGROUND OF THE INVENTION

Commercial aircraft are required to provide historical recording of certain flight parameters to enable post accident investigations. These parameters are typically recorded in a flight data recorder system on all commercial aircraft. The recorded parameters are derived from continuous measurements of certain flight inputs during the operational flight of an aircraft. These parameters include functional inputs that are necessary for aircraft accident investigations and accident reconstruction. In the United States, the Federal Aviation Administration issues rules designating the required recording parameters.

In the future, it is expected that additional rules will be promulgated requiring commercial aircraft to include parameters related to the flight control forces. One of these forces includes the forces provided to the aircraft control surface controller interfaces. As used herein, the term "control surfaces" refers to movable aerodynamic surfaces which are operable for maneuvering the aircraft, such as ailerons, rudders, and elevators. Control surface interfaces are the flight deck controls, such as control wheels, rudder pedals, and control columns and their associated electrical and mechanical interfaces.

One force measurement device is described in U.S. Pat. No. 5,195,381 to Keibler. The Keibler device is a force gauge lever that is removably attached to a landing gear control lever for measuring the force applied to the lever. The Keibler device uses a load cell that is directly pushed by the operator of the landing gear. That is to say that the operator pushes the force gauge to transfer the force to the actual landing gear control lever. The Keibler device is not a permanent part of any aircraft systems, but a stand alone device for performing landing gear system maintenance tasks. Also, modern aircraft control surfaces are controlled either by the pilot or the autopilot system. The landing gear lever, in the Keibler device, is controlled by the pilot only. Thus, this device is not adaptable to being integrated into aircraft flight control systems.

Many contemporary commercial transport planes use electrically signaled primary flight control systems, commonly referred to as "fly-by-wire" flight controls. Such fly-by-wire systems have a primary flight control system that receives inputs from the pilot or auto-pilot system. A fly-by-wire flight control system does not include direct mechanical linkages or control cables between the pilot's controls and the aircraft control surfaces, rather the flight deck controller position transducers change the pilot's manual commands of the control wheel, control columns, and rudder pedals to analog electrical signals. These signals are provided to Actuator Control Electronics (ACE), which convert the commands into a digital signal format, and then provided to the Primary Flight Computer (PFC). The PFCs interface with the airplane systems through flight control ARINC 629 buses. The PFCs calculate flight control commands based on flight control laws from the received aircraft systems data. The digital command signals are then provided to ACEs and converted to an analog control signal, which is provided to direct the electro-hydraulic servo actuators that move the control surfaces. The ACEs and electro-hydraulic servo actuators therefore are a control loop that position the control surfaces based on the PFC commands.

Modern flight control systems also include autopilot operations. In autopilot systems, the PFCs receive autopilot commands from the Autopilot Flight Director Computer (AFDC) and process the autopilot commands in the same manner as the manual pilot commands. The autopilot commands are provided to the PFCs via the ARINC 629 bus. The PFCs process and change the autopilot commands to control surface commands and backdrive commands. The control surface commands from the PFCs go to the ACEs to move the flight control surfaces, while the PFCs send backdrive commands to the AFDCs to operate the backdrive actuators. The backdrive actuators move the flight deck controllers (the control wheels, control columns, and rudder pedals) coincident to the control surface movement. In autopilot, therefore, the position transducers of the flight deck control can supply position feedback.

Typical fly-by-wire PFCs utilize airplane systems data such as Air Data Inertial Reference Units (ADIRU), Secondary Attitude Air Data Reference Units (SAARU), and Airplane Information Management Systems (AIMS) to provide stability augmentation, avoid the critical structural modes, increase passenger comfort, and improve the control and handling characteristics of an aircraft. These result in significant benefit in fuel-efficiency, weight-savings, and drag-reduction.

Flight data recorders record these parameters to assist in accident investigation. In a typical aircraft accident investigation, the investigators attempt to determine whether the suspected position of a control surface was commanded by the pilot or by the autopilot system or by other airplane systems. Thus, the force input recording data would allow identification of critical control surface movements and the source of the loss of airplane control. For example, the recorded force data at a recorded time and its corresponding surface position will determine whether the pilot commanded the surface to that position or the surface was commanded by the autopilot system or another airplane system. Thus, investigators would be able to rule out certain factors and focus on other areas.

In order to know if the accident is a training issue or a system issue, the recorder for a control surface controller that integrates a force measurement system should be able to distinguish between systems inputs and pilot or pilots input to the system. It would also be advantageous for a system to permit determining whether the control system jammed. Additionally, it may be desirable to determine if there is a force fight between the pilots.

Accordingly, there is a need in the art for a force measurement system for measuring the pilot control surface interface force input, such as the airplane pitch (control column), roll (control wheel) and yaw (rudder pedals) attitudes. It would also be desirable to avoid major airframe structural changes in existing aircraft when implementing such a system. A force recording system also should be physically adaptable to many airplane models. Finally, it is desirable to employ components that are compatible to existing aircraft systems.

BRIEF SUMMARY OF THE INVENTION

A control surface controller force measurement system for an aircraft is therefore provided to meet the above desired needs. According to one embodiment of the control surface controller force measurement system, the system includes a control surface interface for positioning the aerodynamic control surfaces on an aircraft. These typically include interfaces such as rudder pedals, control wheels, and control columns. The control surface interface transfers mechanical force to an articulated crank, which supplies the control system with the desired position of the control surface.

The articulated crank comprises a first mechanical link that is pivotable about a first pivot and a second mechanical link that interconnects the control surface interface to the first mechanical link. The second mechanical link is pivotable with respect to the control surface interface at a second pivot. A force transducer, such as a linear variable differential transformer (LVDT), is interconnected to the first and second mechanical links independent of the second pivot. Accordingly, the mechanical force applied to the control surface interface is represented by an electrical signal output of the force transducer.

According to one embodiment of an LVDT force transducer, the LVDT core is interconnected to one mechanical link, while the LVDT magnetic winding is interconnected to another mechanical link. As the mechanical links and the core and windings are in a movable relationship to one another, the position of one to the other causes a unique electrical signal output for that position. In this embodiment the relative movement of the core and windings, and thus the first and second mechanical links, is opposed by a spring interconnecting the first and second mechanical links. Accordingly, the electrical signal is representative of the mechanical force against the spring, and thus also representative of the mechanical force applied to the control surface interface. The invention uses displacement of a known spring rate to find force.

One aspect of the control surface controller force measurement system includes the LVDT being interconnected to a flight control system for receiving the electrical signal. The flight control system may then correlate that electrical signal to a value of the force applied to the control surface interface. Such values are then advantageously stored in a storage medium, for example, a flight data recorder.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
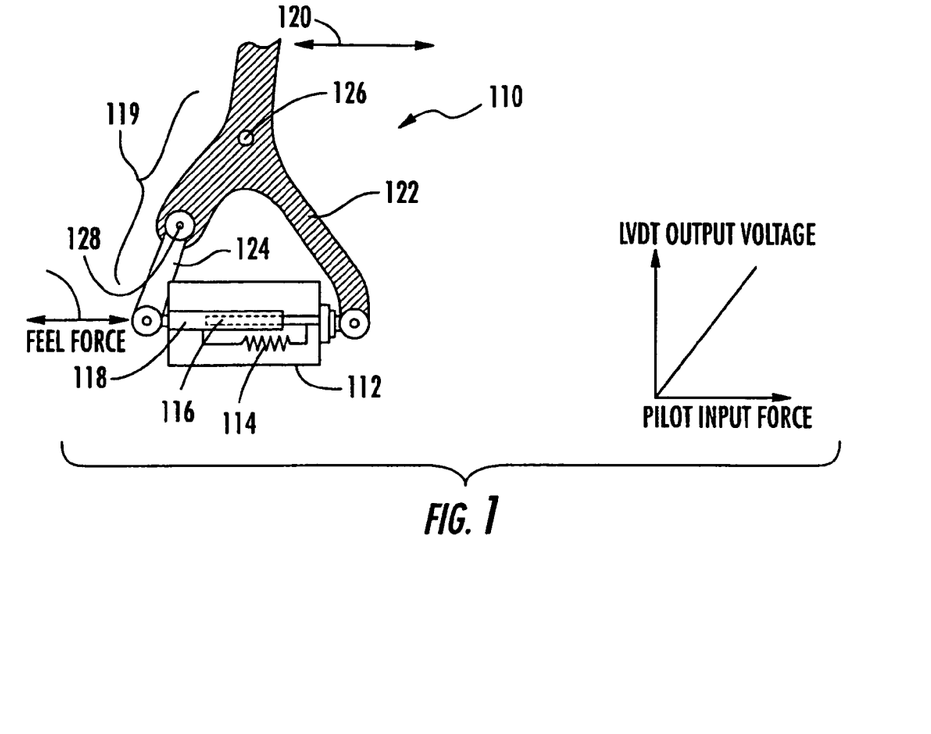
FIG. 1 is a control surface controller force measurement system according to one embodiment of the present invention.

Referring now to FIG. 1, one embodiment of a control surface controller force measurement system 110 is illustrated. The measurement system includes a force transducer 112 and an integral spring 114 disposed between sections of an articulated crank, which in the illustrated embodiment is a "broken-back crank" 119. As used herein, articulated refers to a series of segments or links that are jointed. One example of an articulated crank is a "broken-back" crank that joins two or more links about a common pivot. Other articulated cranks may employ alternative joints and additional pivots.

This embodiment of the force transducer 112 is a linear variable differential transformer (LVDT), however, other force transducers are known to those of ordinary skill in the art and include electrical resistance strain gauges, piezoelectric strain gauges, hydraulic force transducers, pneumatic load cells, etc., and these force transducers may be substituted without departing from the spirit or scope of the present invention. As known to those of ordinary skill, the LVDT 112 provides an output, typically voltage or current, proportional to the relative motion between a magnetic core 116 and magnetic windings 118. As illustrated, the LVDT advantageously permits the opposing feel force to resist movement of the spring 114 and the LVDT core relative to the LVDT magnetic windings. The spring force and LVDT output, therefore, can be resolved such that the LVDT output is linear with respect to the pilot input force 120, as illustrated in FIG. 1.

The LVDT 112 is disposed between two mechanical links 122, 124 of the broken-back crank 119 as illustrated in FIG.

1. The broken-back crank 119 comprises a first mechanical link 122 pivotable about a first pivot 126. The first pivot 126 is either affixed to a stationary object or a least stationary relative to the movement of the crank 116 such that work may be transferred by movement of the crank 122 about the first pivot 126. A second mechanical link 124 is articulated relative to the first mechanical link 122 at a second pivot 128. Unlike the first pivot, the second pivot 128 is not affixed or stationary, but permits relative motion between the first and second mechanical links. A pilot input force 120 applied to the crank then moves both the first and second mechanical links 122, 124 about the first pivot 126 and permits movement of the first mechanical link and second mechanical link about the second pivot relative to one another.

The LVDT 112 is disposed between the first mechanical link 122 and the second mechanical link 124 independent of the second pivot 128 that is not directly connected to the second pivot. For example, the core 116 of the LVDT may be interconnected to the first mechanical link, while the magnetic windings 118 may be interconnected to the second mechanical link, as illustrated in FIG. 1, however, the interconnections may be reversed without affecting the purpose or function of the LVDT. As such, the relative position between the first mechanical link and the second mechanical link produces an electrical output. As the spring force in the LVDT may therefore be selected such that the relative position between the first and second mechanical links 122, 124 is proportional to the amount of pilot input force 120 provided to the broken-back crank in order to rotate about the first pivot. Accordingly, the output of the LVDT is proportional to the amount of pilot input force.

Figure 2:
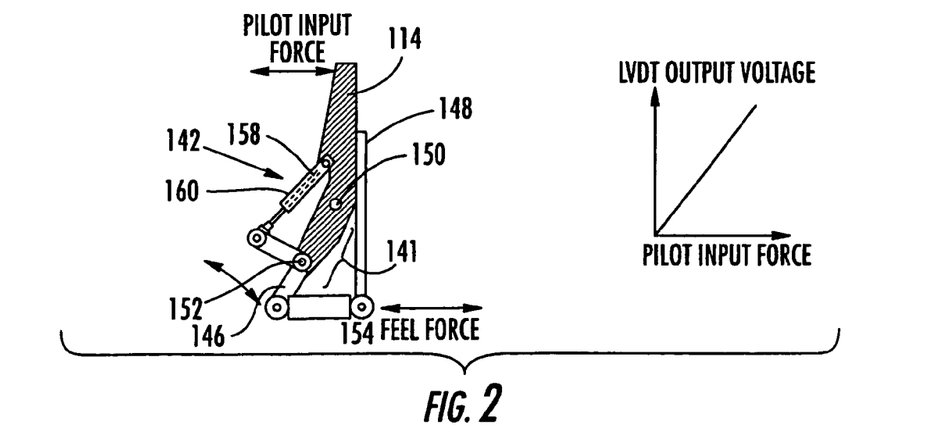
FIG. 2 is a control surface controller force measurement system according to an alternative embodiment of the present invention.

Another embodiment of a control surface controller force measurement system 140 is illustrated in FIG. 2 and includes a force transducer 142, which is also an LVDT, disposed between first and second mechanical links 114, 146 of a broken-back crank 141. In this example and in contrast to FIG. 1, the LVDT does not include an integral spring force, but rather a leaf spring 148 is disposed independent of the LVDT 142 and interconnected to the first and second mechanical links 114, 146. The leaf spring 148 is therefore opposed to the feel force and the relative movement between the LVDT core and the LVDT winding. According to this embodiment, a first mechanical link 114 pivots about an affixed or stationary first pivot 150, while the second mechanical link 146 is articulated to the first mechanical link 144 about a second pivot 152. The LVDT 142 interconnects the first and second mechanical links independently of the second pivot.

As the spring 148 is independently disposed, it is interconnected to the second mechanical link via a third mechanical link 154. In this regard, the third mechanical link 154 is pivotable with respect to the first mechanical link 114, but not the second mechanical link 146. In other words, the third mechanical link is affixed or stationary with respect to the second mechanic link. Accordingly, the movement of the third mechanical link 154 relative to the first mechanical link 114 is substantially the same movement as the second mechanical link 146 relative to the first mechanical link 114.

Also according to this embodiment, the spring 148 is a leaf spring, and interconnected to the broken-back crank 141 via a mechanical device 154 such as another push rod. Alternatively, the mechanical connection may be another spring, transducer, or any device that permits interconnection to the broken-back crank or optimizes the LVDT output with respect to pilot force input. That is to say that only the interconnection is necessary, and other types of interconnections may be substituted so long as the function and purpose of the spring is maintained. Accordingly, it will be recognized by one of ordinary skill that the spring may be directly connected to the broken-back crank without intervening mechanical elements. The described embodiment employing an transducer is a result of physical positioning for particular control surface controller systems with a minimal amount of intrusion to an existing system, and certain of these devices are pre-existing.

The deflection of leaf spring 148, therefore, is proportional to the feel force and provides a relative movement of the LVDT core 158 to the LVDT windings 160, and the spring deflection may be determined such that the LVDT provides an output in relation to the pilot input force. Accordingly, the broken-back crank transfers work from the pilot control surface control input to a control surface control system and the pilot applied force is represented by the output of the LVDT.

Figure 3:
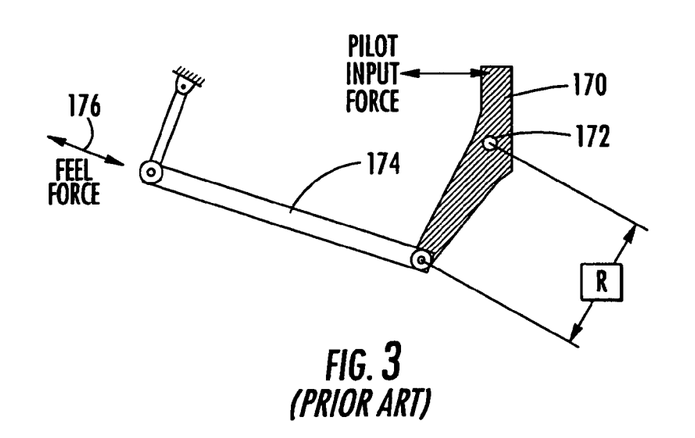
FIG. 3 is a prior art roll crank for a control surface controller.

FIG. 3 represents a prior art crank as employed within a roll control surface interface. The pilot input force is applied to the crank 170 about a pivot 172 and subsequently transferred to a control surface system or a position LVDT, such as in fly-by-wire control systems. A system feel force 176 typically opposes motion of the crank 170. The feel force mechanisms are generally used to provide an appropriate amount of resistance to the pilot input to avoid overcompensation or under-compensation of control surface maneuvering by the pilot.

Figure 4:
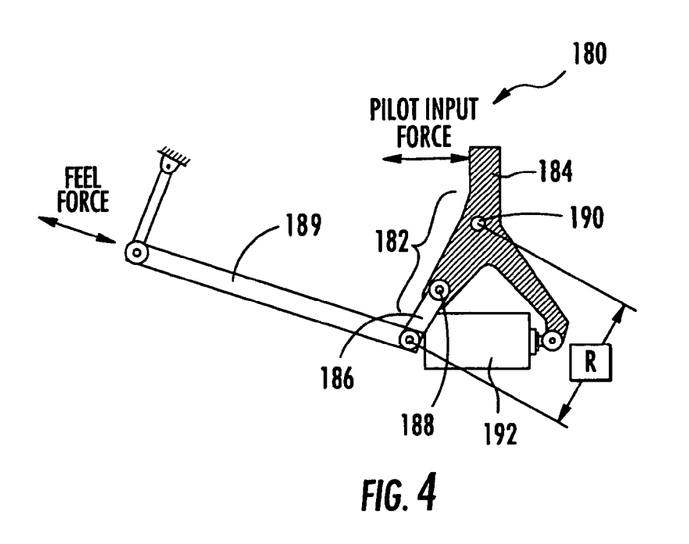
FIG. 4 is a roll control surface controller force measurement system according to one embodiment of the present invention.

FIG. 4 is a control surface controller force measurement system 180 for roll control surface interface according to one embodiment of the present invention. The system includes a broken-back crank 182 comprising first and second mechanical links 184, 186 interconnected and articulated about a second pivot 188. The crank 182 transfers work to a lever interface 189 moving the crank about the first pivot 190, which is affixed or stationary such as described above. A force transducer 192 having an integral spring (not shown) is interconnected between the first and second mechanical links independent of the second pivot 188. Similar to the above described system of FIG. 1, the LVDT core may be attached to one mechanical link, while the LVDT windings may be attached to the other mechanical link. Accordingly, a portion of the lever's 184 input force is applied against feel force and the deflection of the spring of the force transducer resulting in motion of the LVDT core relative to the LVDT windings. Accordingly, the output of the LVDT is proportional to the force against the spring and may be correlated to the total pilot input force applied to the lever 184.

As illustrated, this embodiment of a control surface controller measurement system 180 may advantageously replace the prior art crank of the prior art system. The lever 184 from which pilot input force is applied now interconnects to the second mechanical link 186 of the articulated crank 182. Similarly, the push rod 189 is interconnected to the same feel force system that opposes the motion of the first mechanical link about the first pivot. Accordingly, the prior art crank may be replaced by the control surface controller measurement system crank of the present invention maintaining the connections and functionality of the remaining control surface controller.

Figure 5:
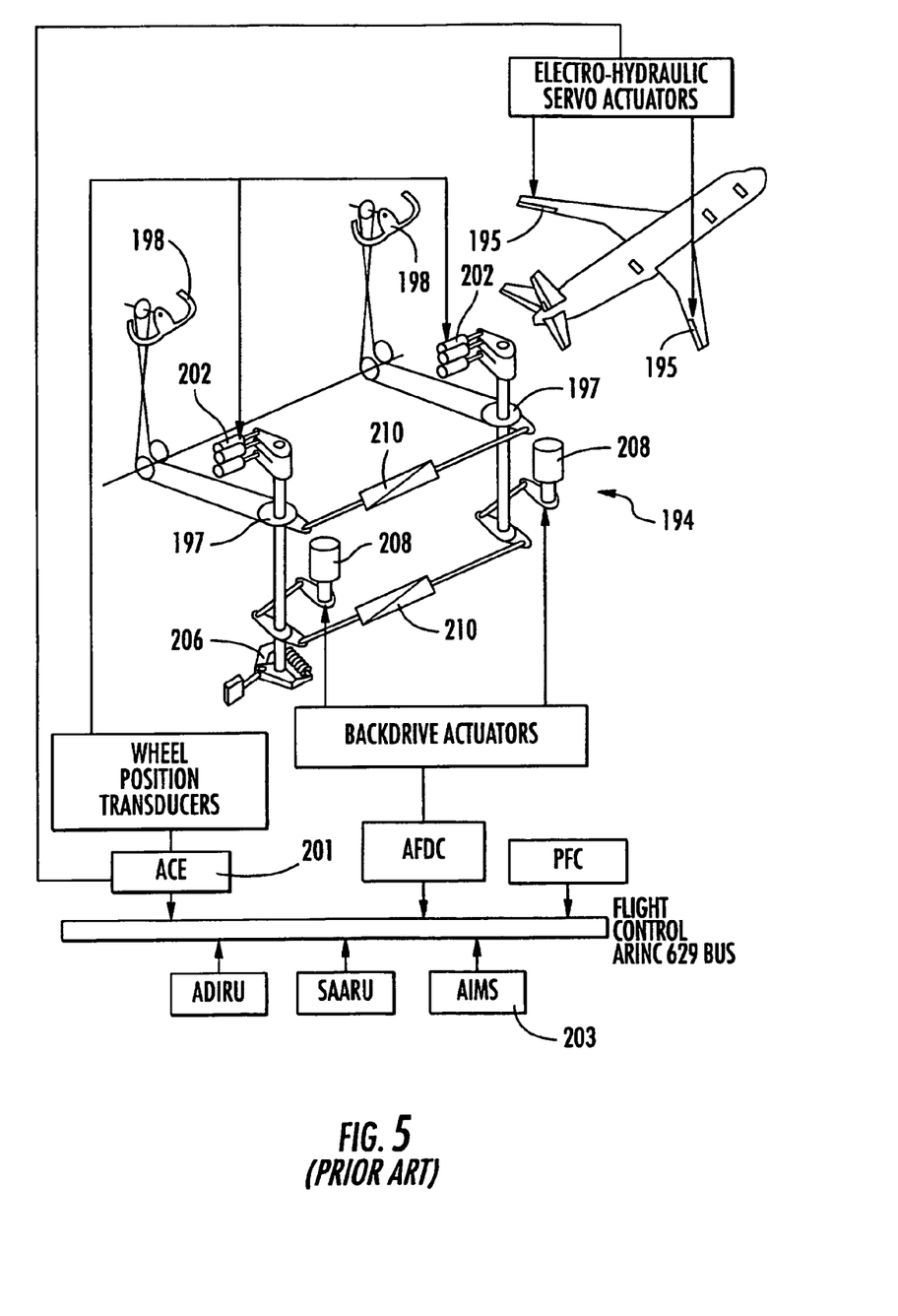
FIG. 5 is a prior art aileron control system.

FIG. 5 is a line diagram depicting the prior art lateral control system 194 of a control surface controller for a Boeing 777 aircraft. The lateral control system provides control of aileron surfaces 195 and spoilers (not shown) via the flight control laws and commanded position of the control surface controller input device, in this case, a control wheel 198. The pilot input force is applied to either of the control wheel interfaces 198 about the rotating cranks 197 to wheel position transducers 202. The transducers 202 provide the commanded position to the fly-by-wire system. Also included in the system are the feel force and centering mechanism 206, backdrive actuators 208 and jam override devices 210, as are typically located in the system as known to those of ordinary skill in the art. As previously described in the background of the invention, the position transducers provide analog position input to the ACE 201 for conversion to a digital signal and processing by the flight control software of the PFCS and the AIMS 203. FIG. 5 and the following drawings illustrate typical flight control systems, ADIRU, SAARU, ACE, and PFC elements are included in the block diagram description of the flight control system as described in the background above. These elements are included for completeness of discussion in reference to typical flight control systems but not included for purposes of limitation.

Figure 6:
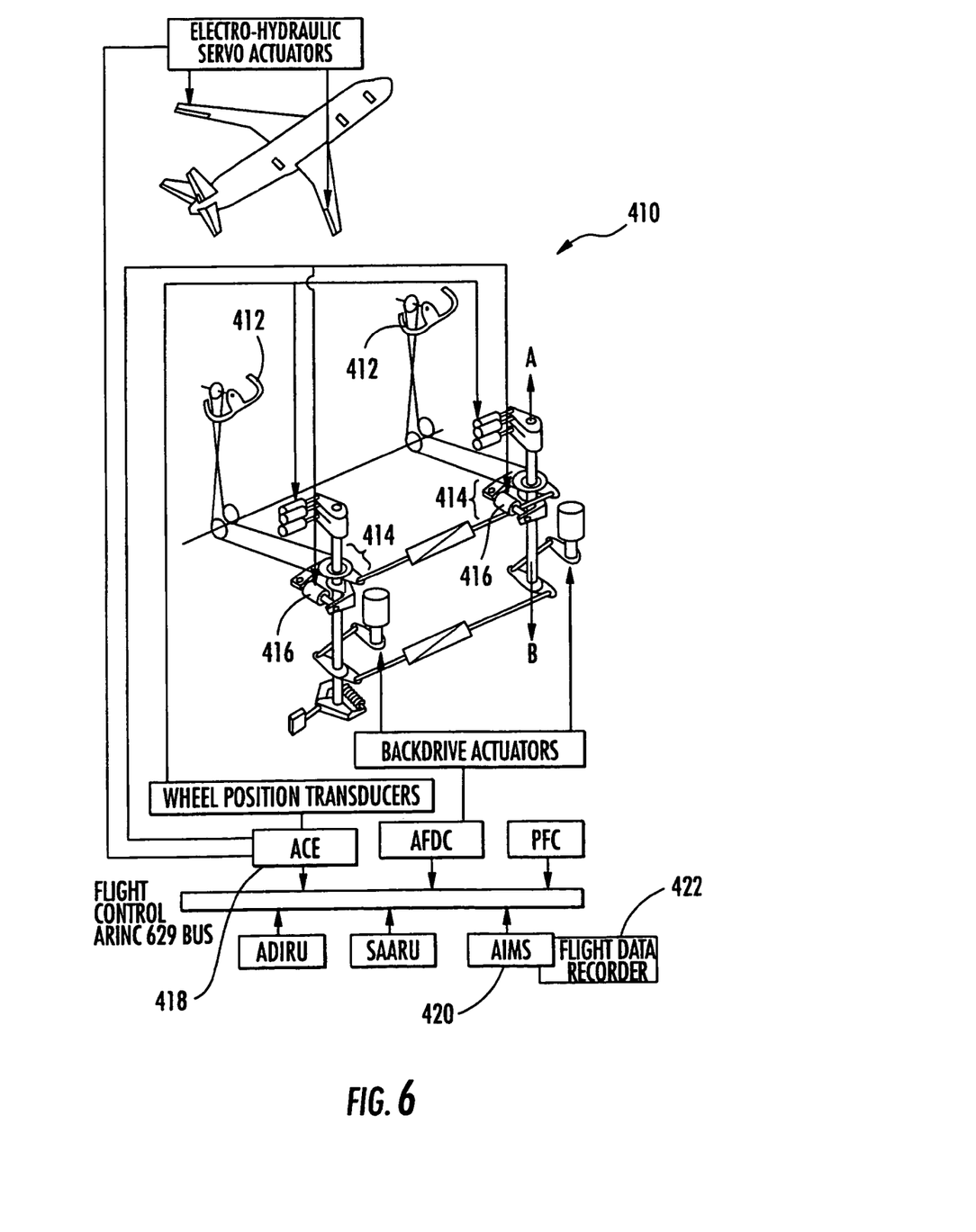
FIG. 6 is an aileron control system employing a roll control controller measurement system according to one embodiment of the present invention.

FIG. 6 is a line diagram depicting the lateral control system incorporating a control surface controller measurement system in replacement of the crank of the previous system. Like the prior art lateral control system, the pilot input force is applied to either of the control wheel interfaces 412 about broken-back cranks 414 to wheel position transducers, which provide wheel input to the fly-by-wire system. The control surface controller force measurement system advantageously replaces the prior art lateral control system crank with a broken-back crank 414 and force measurement LVDT 416 and integral spring (not shown).

In operation, the pilot force rotates the articulated first link of the broken-back crank 414 about axis A. The LVDT 416 therefore measures the relative position of the links of the broken-back crank and LVDT core and winding, which is proportional to the force applied to the spring and thus the pilot input force applied to the control wheel 412. The articulated second link of the broken-back crank 414 rotates about the axis B, which is co-axial to A in this embodiment. The links of the broken-back crank may be rotated in either direction against the feel spring force, and therefore, the position of the LVDT corresponds to direction of rotation for the control wheel. Accordingly, the output of the LVDT corresponds to both the magnitude of force applied and also the direction of force. The LVDT analog output is therefore provided to an ACE 418 for conversion to a digital signal for processing by the AIMS 420 and storage in the Flight Data Recorder 422. The incorporation of the LVDT force transducer therefore permits modification to the AIMS software in order to store the values of force to the flight data recorder.

The control surface controller force measurement system can therefore be used to distinguish several different types of events of concern to flight accident investigators. Specifically, the force measurement system helps to distinguish between system inputs and pilot inputs. It also helps to determine whether a jam exists in the system or whether a force fight existed between the pilots. In distinguishing between system inputs and pilot input, the recorded wheel force input data may be compared to commanded positions for the control surfaces. For example, if the measured pilot input force is at zero and the commanded position is at any position other than zero (or some nominal position corresponding to the pilot's centered input), then the autopilot control system is providing an erroneous command. As such, the pilot's command of the control wheel can be ruled out as an accident cause.

In determining whether there is a jam in the system, the pilot input force and the wheel position transducers inputs of each control wheel may be compared. A jam typically disables one or the other of the control wheel position transducer input. For example, if the force and position measurement system, reveal that the captain control wheel position input has applied and the first-officer control wheel input is constant, then a jam exists between the two control wheel inputs. Finally, the force measurement system may help to establish whether a force fight exists between pilots, that is one pilot commands a position opposed to the input from the other pilot. In this regard, the measured control forces and the wheel position transducers on both wheels may be compared and if opposite sign of wheel positions are measured, then one pilot was opposing the other's movement.

Figure 7:
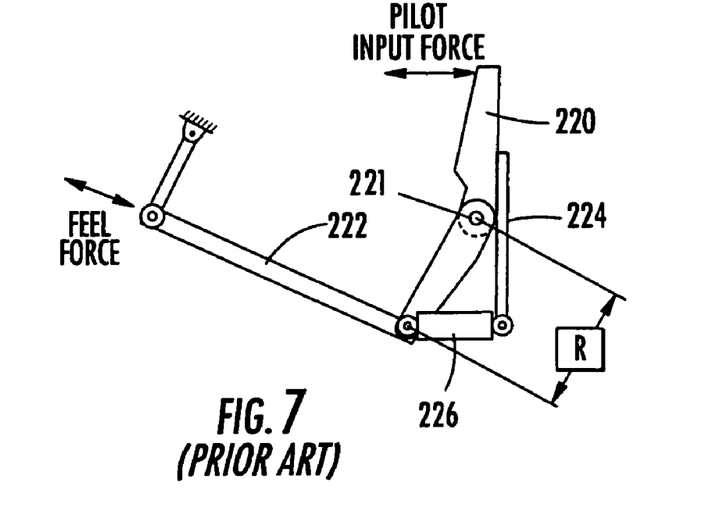
FIG. 7 is a prior art pitch crank for a control surface controller.

FIG. 7 illustrates a prior art crank 220 for a pitch control system control surface interface. Like the prior art roll control crank, the pitch control crank receives pilot input force from the crank 220, typically a flight column interface, and transfers work about the crank 220 and fixed pivot 221 to the control surface control system. A leaf spring 224 and link 226 are also provided on the prior art system.

Figure 8:
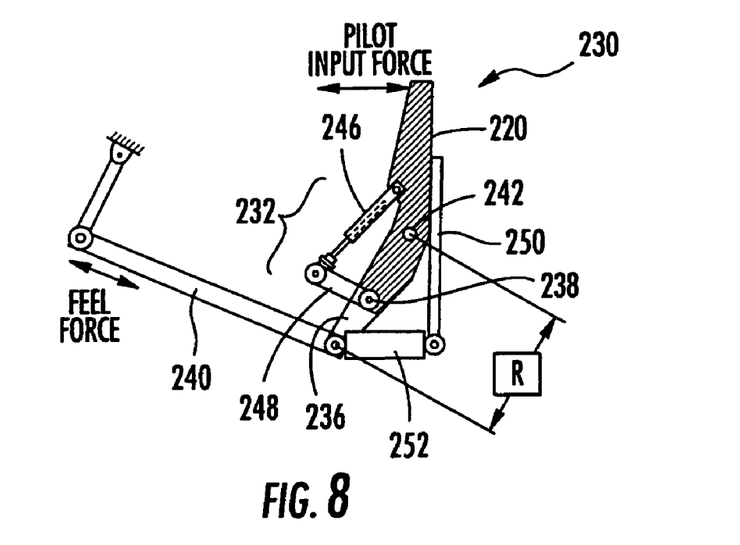
FIG. 8 is a pitch control surface controller force measurement system according to one embodiment of the present invention.

FIG. 8 is a control surface controller measurement system 230 for pitch control according to one embodiment of the present invention. The system includes a broken-back crank comprising articulated first and second mechanical links 230, 236 interconnected about a second pivot 238. The crank 252 transfers work from a spring 250 interface about the first pivot 242, which is affixed or stationary. A force transducer is interconnected between the first and second mechanical links 252, 236, and the interconnection is independent of the second pivot, which is not affixed. The force transducer 246 is also an LVDT, having the LVDT winding interconnected to one mechanical link and the LVDT core interconnected to the other mechanical link permitting relative movement therebetween.

The second mechanical link 236 also interconnects to the leaf spring 250 and link 252. A portion of the pilot input force applied to the lever 220 is transferred to leaf spring 250. Advantageously, the same leaf spring 250 may provide resistance of motion between first and second mechanical links translating motion to the force transducer. Accordingly, motion between the first and second mechanical links, resisted by the leaf spring, is also translated to motion of the force transducer. As such, the output of the LVDT 246 may be correlated to the pilot input force applied to the lever 220.

Figure 9:
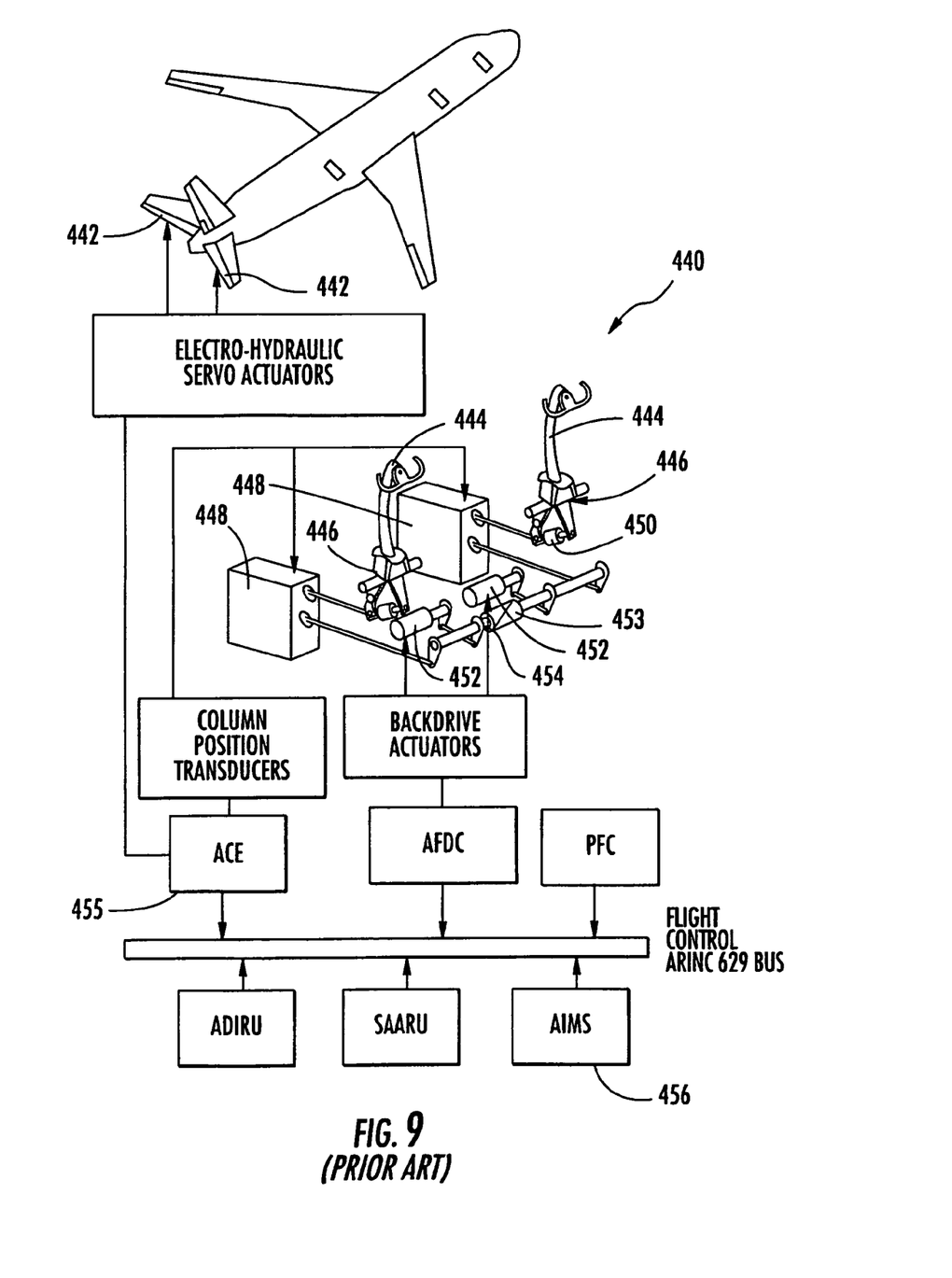
FIG. 9 is a prior art elevator control system.

FIG. 9 is a line diagram depicting the prior art elevator control system 440 of a control surface controller for a Boeing 777 aircraft. The elevator control system provides control of elevator control surfaces 442 via the flight control laws and commanded position of the control surface controller input device, in this case, a pilot column 444. The pilot input force is applied to either of the pilot column 444 about the rotating cranks 446 to column position transducers 448. Also included in the system are backdrive actuators 452, and jam override devices 453, as are typically located in such systems as known to those of ordinary skill in the art. The column position transducer provides input to the ACE 455 for conversion to a digital signal and processing by the flight control software of the AIMS 456. Accordingly, the flight control software commands the elevator position and controls backdrive actuators 452 according to flight control laws.

Figure 10:
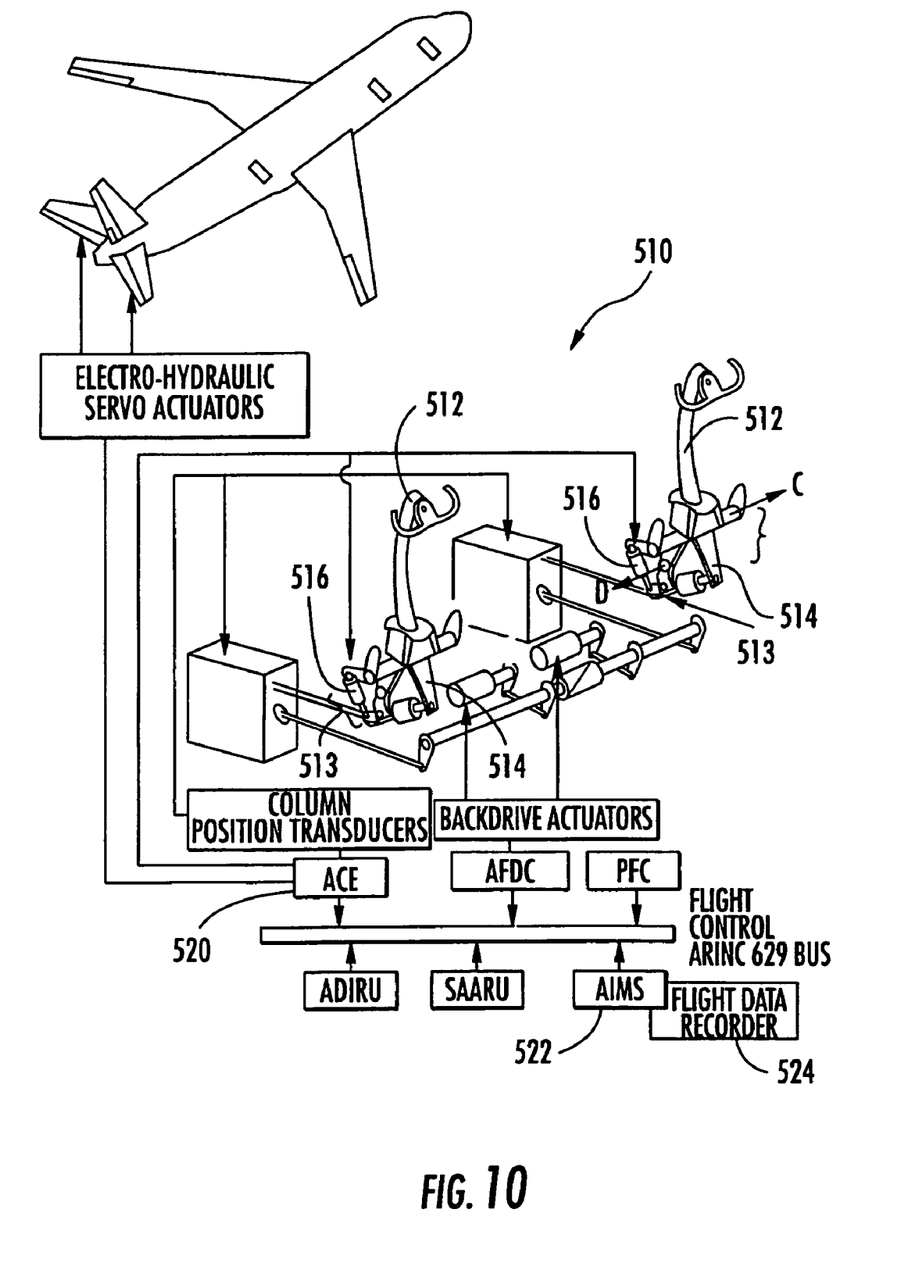
FIG. 10 is an elevator control system employing a pitch control controller measurement system according to one embodiment of the present invention.

FIG. 10 is a line diagram of an elevator control system 510 incorporating a control surface controller measurement system according to one embodiment of the present invention. As can be seen, the prior art pitch control crank in the prior art elevator control system is advantageously replaced by the control surface controller measurement system without effecting the operation and functionality of the existing system.

The pilot's force input rotates the control column 512 about the axis C. The broken-back crank 513 rotates about axis D. Like the prior art system, a leaf spring 514 deflects proportional to the pilot input force, and the magnitude of deflection therefore corresponds to the position of the LVDT. As such, the position of the LVDT is proportional to the force applied to the column. The broken-back crank 513 may be rotated in either direction against the force of the spring. Accordingly, the output of the LVDT corresponds to the magnitude of force applied and also the direction of force. The direction of force corresponds to the commanded elevator direction from the pilot's control surface interface column 512. The LVDT analog output is provided to an ACE 520 for conversion to a digital signal for processing by the AIMS 522 and storage in the Flight Data Recorder 524.

The force measurement system in an elevator control system can therefore be used to distinguish several different types of events of concern to flight accident investigators similar to the lateral control system force measurement system. To distinguish between system commands and pilot commanded inputs to the system, the forces may be compared to the elevator's commanded position. For example, if the recorded pilot input force is at zero and the commanded position is at any position other than zero (or some nominal position corresponding to the pilot's centered input), then the flight control system is making an erroneous command and the pilot's command of the control column can be ruled out as a cause.

In determining whether there is a jam in the system, the force inputs of each control column may be compared. A jam typically disables one or the other of the control column inputs. For example, if the recording system reveals that one control column input has force applied and the other is constant, then a jam exists between the two control column inputs. Finally, the control force recording system may help to establish whether a force fight exists between pilots, that is one pilot commands a column position opposed to the input from the other pilot. In this regard, the measured control forces may be compared and if opposite sign forces are recorded, then one pilot was opposing the other's movement.

Figure 11:
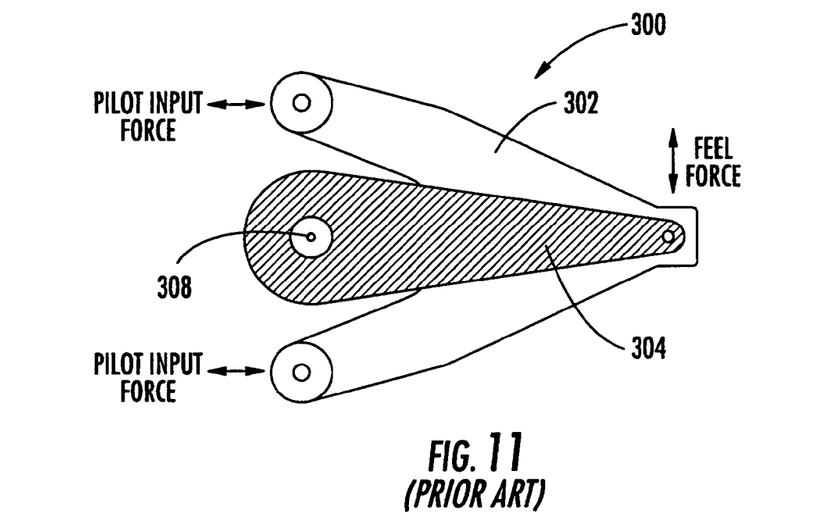
FIG. 11 is a prior art yaw crank for a control surface controller.

FIG. 11 illustrates a prior art crank 300 for a yaw control system control surface interface. The yaw control crank typically comprises a yoke 302 and a crank lever 304 actuated by two flight control surface controller pedal interfaces (not shown), a left pedal interface and a right pedal interface. Each pedal provides pilot input force to opposed ends of the yoke 302. The crank lever 304 pivots about a first pivot 308, which is either affixed or stationary. The yoke 302 is interconnected to a crank lever and transfers work to the crank lever that provides input to a pedal position transducer for fly-by-wire flight control systems. A feel force opposes motion of the crank.

Figure 12:
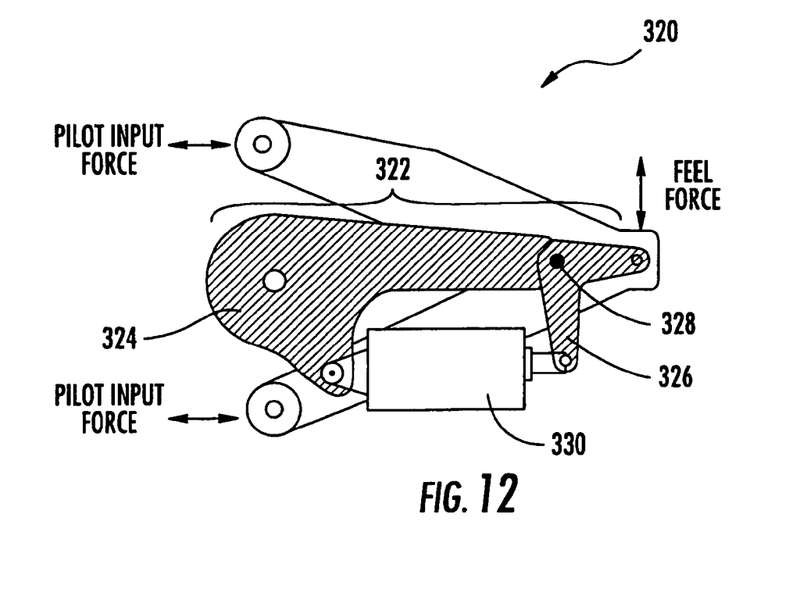
FIG. 12 is a yaw control surface controller force measurement system according to one embodiment of the present invention.

FIG. 12 illustrates an embodiment of control surface controller measurement system 320 for a yaw control surface controller. In this embodiment, the system includes a broken-back crank 322 having first and second mechanical links 324, 326 articulated at a second pivot 328. A force transducer 330 interconnects the first and second mechanical links independent of the second pivot 328. The force transducer 330 comprises an LVDT transducer having an integral spring (not shown) opposed to relative motion between the LVDT windings and LVDT core. The LVDT core is interconnected to one mechanical link, and the LVDT windings are connected to the other and permitting relative motion therebetween. As the pilot input force is applied to the crank 320, the force is transferred against the integral spring and causing relative motion between the LVDT core and LVDT windings. Accordingly, the LVDT 330 provides an output proportional to the input force.

Figure 13:
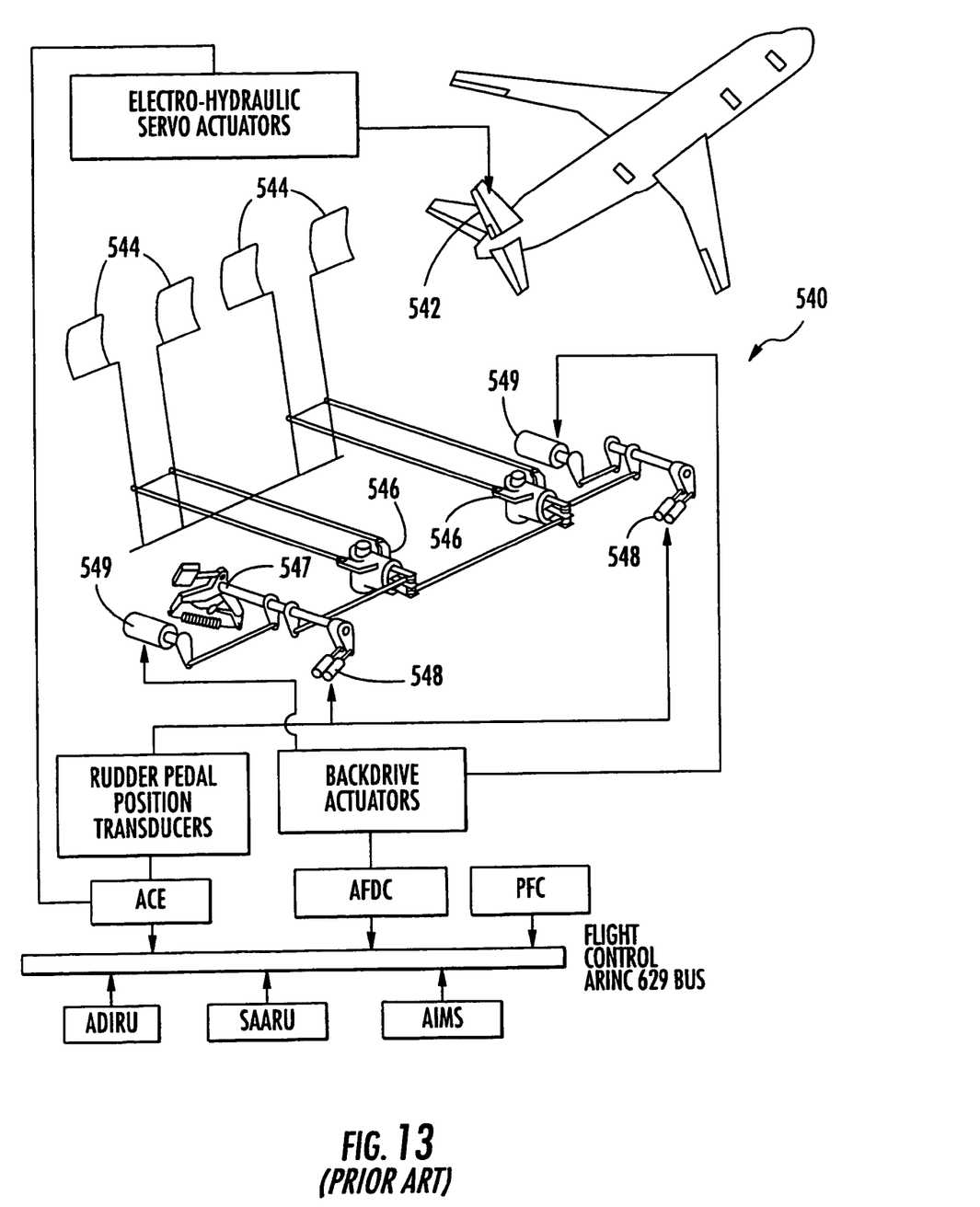
FIG. 13 is a prior art rudder control system.

FIG. 13 is a line diagram depicting the prior art rudder control system 540 of a control surface controller for a Boeing 777 aircraft. The rudder control system provides control of the rudder control surface 542 via the flight control laws and commanded position of the control surface controller input device, in this case, a set of rudder pedals 544. The pilot input force is applied to either of the sets of rudder pedal interfaces about the rotating yoke cranks 546 to rudder pedal position transducers 548. The rudder pedal position transducers 548 provide the commanded position to the fly-by-wire system. The fly-by-wire system is operated in a manner as described above in the background of the invention. Also included in the system are the feel force and centering mechanisms 547 and backdrive actuators 549.

Figure 14:
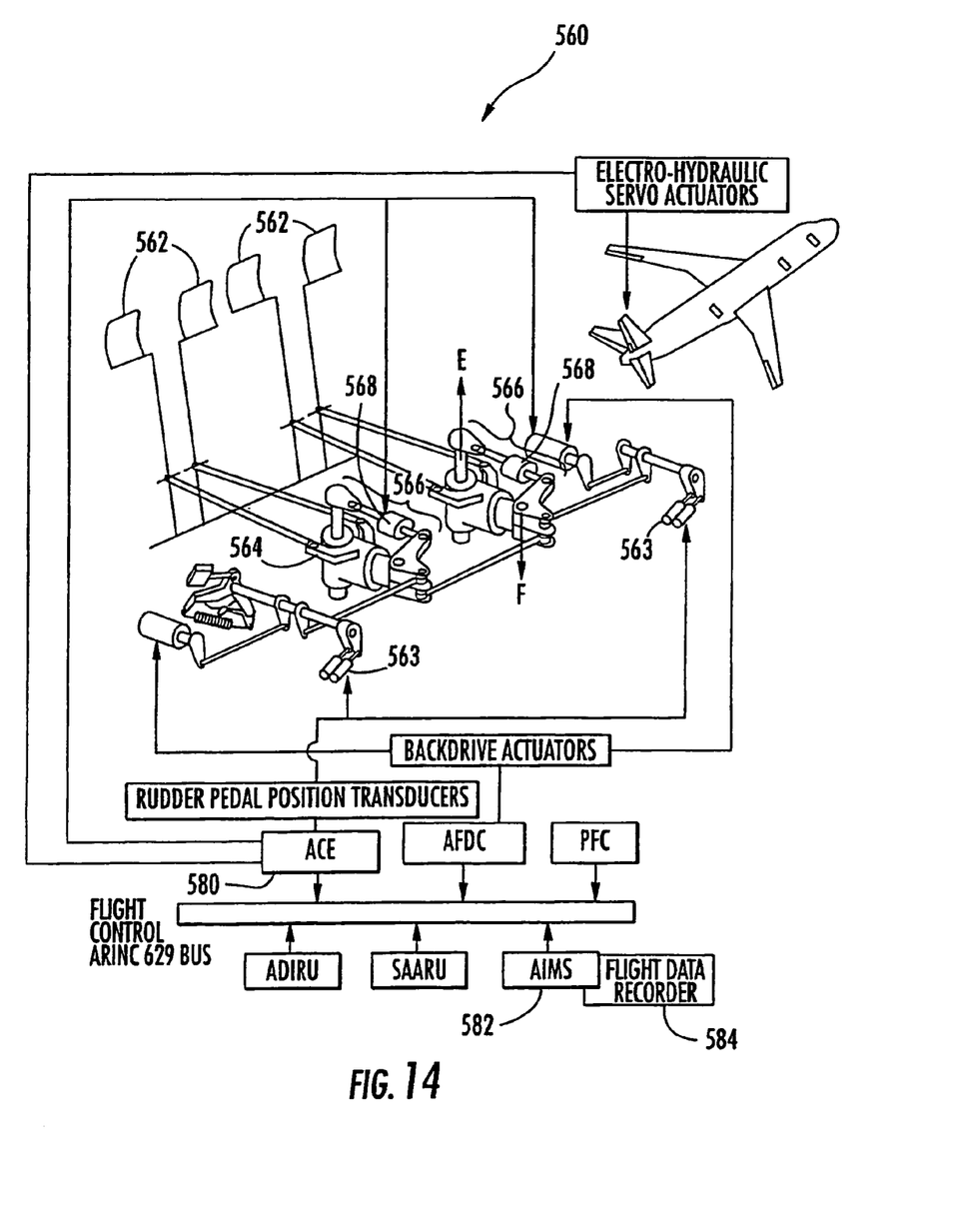
FIG. 14 is a rudder control system employing a yaw control controller measurement system according to one embodiment of the present invention.

FIG. 14 illustrates a line diagram implementation of the control surface controller measurement system in a rudder control system 560. The pilot input force is applied to either of two sets of pedal interfaces 562 about the yoke cranks 564 to rudder pedal position transducers 563 via the broken-back crank.

The pilot's force input force to the pedals rotates the yoke 564 about the axis E. The broken-back crank 566 rotates about the axis F. A spring (not shown) integral to the LVDT transducer 568 deflects proportional to the pilot input force, and the magnitude of deflection therefore corresponds to the deflection of the LVDT 568. As such, the position of the LVDT is proportional to the pilot input force applied to the rudder pedals 562. The broken-back crank 566 may be rotated in either direction against the force of the integral spring. Accordingly, the output of the LVDT may correspond to the magnitude of pilot input force applied and also the direction of pilot input force. The direction of force corresponds to the commanded rudder direction from the pilot's rudder pedals, either a depression of the left pedal or the right pedal. The LVDT analog output is therefore provided to an ACE 580 for conversion to a digital signal for processing by the AIMS 582 and storage in the Flight Data Recorder 584.

The rudder pedal control force measurement system can therefore be used to distinguish several different types of events of concern to flight accident investigators similar to the elevator and lateral control system force measurement systems, described previously. In distinguishing between system inputs and pilot input, the measured rudder pedal force input data of each of the two sets of rudder pedals may be compared to commanded positions for the rudder. For example, if the measured pilot input force is at zero and the commanded position is at any position other than zero (or some nominal position corresponding to the pilot's centered input), then the flight control system is making an erroneous command and the pilot's command of the rudder pedals can be ruled out as an accident cause.

In determining whether there is a jam in the system, the force inputs of each set of rudder pedals may be compared. A jam typically disables one or the other of the sets of rudder pedals inputs. For example, if the recording system reveals that one rudder pedal set has force applied and the other is constant, then a jam exists between the two rudder pedals sets. It should be noted that most rudder pedal systems do not include a jam override between the pedals, as rudder pedals are not manually controlled during cruise flight. In cruise flight, the flight control system controls rudder position via a yaw damper or gust suppression function. Finally, the control force recording system may help to establish whether a force fight exists between pilots, that is one pilot commands a position opposed to the input from the other pilot. In this regard, the recorded control forces may be compared and if opposite sign forces are recorded, then one pilot was opposing the others movement.

Therefore, embodiments of the present invention provide a control surface controller measurement system for permitting storage of control surface controller forces in a flight data recorder or other storage medium. The control surface controller measurement system of the present invention may advantageously be implemented in fly-by-wire flight control systems by providing a broken-back crank interconnected by a force transducer. Accordingly, the prior art crank may be replaced by the control surface controller measurement system crank of the present invention maintaining the connections and functionality of the remaining control surface controller. In implementation with fly-by-wire systems, in particular, the use of an LVDT force transducer advantageously permits the LVDT to provide an output to existing electronics that are already prepared to receive and convert LVDT data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control surface controller force measurement system for an aircraft, comprising:
   a control surface interface having a range of motion for providing pilot input mechanical force for positioning at least one aerodynamic control surface on an aircraft;
   a first mechanical link being pivotable about a first pivot and interconnected to the control surface interface for transferring mechanical force applied to the control surface interface;
   a second mechanical link interconnecting the control surface interface to the first mechanical link, the second mechanical link being pivotable with respect to the control surface interface at a second pivot; and
   a force transducer for transducing the mechanical force applied to the control surface interface to a representative electrical signal, the force transducer having first and second portions and being operably interconnected at the first portion to the first mechanical link and operably interconnected at the second portion to the second mechanical link and the interconnections to the first and second portions being independent of the second pivot.

2. The control surface controller force measurement system according to claim 1, further comprising a flight control system for receiving the electrical signal and correlating that electrical signal to a value of the force applied to the control surface interface.

3. The control surface controller force measurement system according to claim 1, wherein the control surface interface comprises a controller interface selected from the group consisting of a rudder pedal, a yaw and roll control wheel, and a pitch control column.

4. The control surface controller force measurement system according to claim 1, wherein the force transducer comprises a linear variable differential transformer (LVDT) comprising a magnetic core disposed within magnetic windings, the core and windings permitting movement relative to one another, and a spring biased against movement of the core with respect to the windings.

5. The control surface controller force measurement system according to claim 4, wherein the spring is disposed in the LVDT.

6. The control surface controller force measurement system according to claim 4, wherein the spring is disposed interconnecting the first and second mechanical links.

7. The control surface controller force measurement system according to claim 1, further comprising a third mechanical link operably interconnecting the force transducer to the second mechanical link, the third mechanical link being in a fixed relationship to the second mechanical link.

8. The control surface controller force measurement system according to claim 1, further comprising a yoke interconnecting the control surface interface to the first mechanical link.

9. The control surface controller force measurement system according to claim 8, wherein the control surface interface comprises right and left pedals, the right pedal being operably interconnected to one portion of the yoke, the left pedal being operably interconnected to an opposed portion of the yoke.

10. A control surface controller force measurement system for an aircraft, comprising:
    a control surface interface having a range of motion for providing pilot input mechanical force for positioning the aerodynamic control surfaces on an aircraft;
    an articulated crank interconnected to the control surface interface for transferring mechanical force applied to the control surface interface, the articulated crank comprising at least two mechanical links operably interconnected at a pivot; and
    a force transducer for transducing the mechanical force applied to the control surface interface to a representative electrical signal, the force transducer being operably interconnected to both the at least two mechanical links independent of the pivot.

11. The control surface controller force measurement system according to claim 10, further comprising a flight control system for receiving the electrical signal and correlating that electrical signal to a value of the pilot input force applied to the control surface interface.

12. The control surface controller force measurement system according to claim 10, wherein the control surface interface comprises a controller interface selected from the group consisting of a rudder pedal, a yaw and roll control wheel, and a pitch control column.

13. The control surface controller force measurement system according to claim 10, wherein the force transducer comprises a linear variable differential transformer (LVDT) comprising a magnetic core disposed within magnetic windings, the core and windings permitting movement relative to one another, and a spring biased against movement of the core with respect to the windings.

14. The control surface controller force measurement system according to claim 13, wherein the spring is disposed in the LVDT.

15. The control surface controller force measurement system according to claim 13, wherein the spring is disposed operably interconnecting the at least two mechanical links.

16. The control surface controller force measurement system according to claim 10, further comprising a yoke interconnecting the control surface interface to the articulated crank.

17. The control surface controller force measurement system according to claim 8, wherein the control surface interface comprises right and left pedals, the right pedal being operably interconnected to one portion of the yoke, the left pedal being operably interconnected to an opposed portion of the yoke.

18. A control surface controller force measurement system for an aircraft, comprising:
- a control surface interface having a range of motion for providing pilot input mechanical force for positioning the aerodynamic control surfaces on an aircraft;
- an articulated crank interconnected to the control surface interface for transferring mechanical force applied to the control surface interface, the articulated crank comprising a first mechanical link and a second mechanical link, first and second links being operably interconnected at a pivot;
- a linear variable differential transformer having a core and a magnetic winding in movable relationship to one another, the magnetic winding being mechanically interconnected to the first mechanical link independent of the pivot, the magnetic winding being mechanically interconnected to the second mechanical link; and
- a spring operably interconnecting the first and second mechanical links and biased in opposition to movement of the core relative to the magnetic winding, wherein a relative position between the core and magnetic winding produces a electrical signal representative of the mechanical force.

19. The control surface controller force measurement system according to claim 18, further comprising a flight control system for receiving the electrical signal and correlating that electrical signal to a value of the mechanical force applied to the control surface interface.

20. The control surface controller force measurement system according to claim 18 wherein the control surface interface comprises a controller interface selected from the group consisting of a rudder pedal, a yaw and roll control wheel, and a pitch control column.

21. The control surface controller force measurement system according to claim 18, wherein the spring is disposed in the LVDT.

22. The control surface controller force measurement system according to claim 18, further comprising a yoke interconnecting the control surface interface to the articulated crank.

23. The control surface controller force measurement system according to claim 22, wherein the control surface interface comprises right and left pedals, the right pedal being operably interconnected to one end of the yoke, the left pedal being operably interconnected to an opposed end of the yoke.

* * * * *